US009519343B2

(12) United States Patent
Isozu et al.

(10) Patent No.: US 9,519,343 B2
(45) Date of Patent: Dec. 13, 2016

(54) INFORMATION PROCESSING APPARATUS, INFORMATION PROCESSING METHOD, AND PROGRAM FOR CONVERTING PROFICIENCY LEVELS INTO INDICES

(71) Applicant: Sony Corporation, Tokyo (JP)

(72) Inventors: Masaaki Isozu, Tokyo (JP); Kazuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 555 days.

(21) Appl. No.: 13/787,091

(22) Filed: Mar. 6, 2013

(65) Prior Publication Data
US 2013/0257715 A1    Oct. 3, 2013

(30) Foreign Application Priority Data
Mar. 28, 2012    (JP) ................................. 2012-075031

(51) Int. Cl.
*G06Q 10/00*    (2012.01)
*G06F 3/01*    (2006.01)
*G06F 9/44*    (2006.01)

(52) U.S. Cl.
CPC ............... *G06F 3/01* (2013.01); *G06F 9/4443* (2013.01)

(58) Field of Classification Search
CPC ............ H04N 1/10–21/00; H04L 1/00–69/00; G06F 1/00–21/00
USPC ............ 705/50, 80, 1.1, 7.11–7.42; 396/310
See application file for complete search history.

(56) References Cited

U.S. PATENT DOCUMENTS

| 4,366,960 A * | 1/1983 | Bromley ................... A63F 9/24 463/8 |
| 6,981,242 B2 * | 12/2005 | Lehmeier .............. G06F 9/4446 707/999.202 |
| 7,674,181 B2 * | 3/2010 | Yates ...................... A63F 13/00 434/320 |

(Continued)

FOREIGN PATENT DOCUMENTS

JP    2007-233122 A    9/2007

OTHER PUBLICATIONS

Wang, Jidong, et al., "Ranking Users Relevance to a Topic through Link Analysis on Web Logs" at the Proceedings of the 4th International Workshop on Web Information and Data Management in McLean, Virginia; pp. 49-54 (ACM Press—Nov. 8, 2002).*

(Continued)

*Primary Examiner* — Alan S Miller
(74) *Attorney, Agent, or Firm* — Chip Law Group

(57) ABSTRACT

An information processing apparatus includes a communication unit, a storage, and a controller. The storage is configured to store rule information indicating a rule for calculating points of a user in accordance with a type of an operation by the user. The controller is configured to calculate, based on a detected operation of a first user and the rule information, points of the first user in accordance with a type of the detected operation, to control the storage to store first point information indicating the calculated points, and to control the communication unit to perform one of transmission of the stored first point information to another information processing apparatus and reception of second point information from the other information processing apparatus, the second point information indicating points of a second user and being stored in the other information processing apparatus.

12 Claims, 14 Drawing Sheets

(56) References Cited

U.S. PATENT DOCUMENTS

| | | | | |
|---|---|---|---|---|
| 7,738,860 B2* | 6/2010 | Attride | G06F 9/4446 | |
| | | | 455/414.1 | |
| 7,849,115 B2* | 12/2010 | Reiner | A61B 5/411 | |
| | | | 707/912 | |
| 7,857,317 B2* | 12/2010 | Noda | F41J 5/00 | |
| | | | 273/245 | |
| 8,786,636 B2* | 7/2014 | Miyazawa | G06F 1/1626 | |
| | | | 345/419 | |
| 8,825,802 B2* | 9/2014 | Pearce | G07F 17/32 | |
| | | | 463/41 | |
| 2003/0115176 A1* | 6/2003 | Bobroff | G06F 17/30604 | |
| 2003/0135818 A1* | 7/2003 | Goodwin | G06F 17/30616 | |
| | | | 715/205 | |
| 2005/0054381 A1* | 3/2005 | Lee | G06F 3/011 | |
| | | | 455/557 | |
| 2006/0094502 A1* | 5/2006 | Katayama | A63F 13/10 | |
| | | | 463/31 | |
| 2007/0072156 A1* | 3/2007 | Kaufman | G09B 19/0092 | |
| | | | 434/236 | |
| 2008/0063357 A1* | 3/2008 | Kunieda | G11B 27/034 | |
| | | | 386/278 | |
| 2008/0306985 A1* | 12/2008 | Murray | G06Q 10/10 | |
| 2009/0112993 A1* | 4/2009 | Miyamoto | G06Q 10/10 | |
| | | | 709/205 | |
| 2009/0298020 A1* | 12/2009 | Corcoran | G09B 19/0053 | |
| | | | 434/118 | |
| 2010/0203933 A1* | 8/2010 | Eyzaguirre | A63H 13/10 | |
| | | | 463/2 | |
| 2010/0291529 A1* | 11/2010 | Carter | G09B 7/00 | |
| | | | 434/362 | |
| 2011/0092273 A1* | 4/2011 | Cerbini | G06Q 30/02 | |
| | | | 463/25 | |
| 2011/0112717 A1* | 5/2011 | Resner | G07C 5/008 | |
| | | | 701/31.4 | |
| 2011/0117529 A1* | 5/2011 | Barash | G09B 23/288 | |
| | | | 434/265 | |
| 2011/0172009 A1* | 7/2011 | Tan | A63F 13/10 | |
| | | | 463/31 | |
| 2011/0243529 A1* | 10/2011 | Oryoji | G06F 17/30799 | |
| | | | 386/248 | |
| 2011/0302169 A1* | 12/2011 | Brdiczka | G06Q 30/02 | |
| | | | 707/740 | |
| 2012/0150758 A1* | 6/2012 | Belady | G06Q 30/018 | |
| | | | 705/317 | |
| 2012/0189996 A1* | 7/2012 | Hager | G09B 7/00 | |
| | | | 434/262 | |
| 2013/0171594 A1* | 7/2013 | Gorman | G09B 5/00 | |
| | | | 434/219 | |

OTHER PUBLICATIONS

Chong, Victor Vui-Kiat. Heuristics for mitigating mode confusion in digital cameras. Diss. University of Victoria, 2006.*

* cited by examiner

| Operation item | Points |
|---|---|
| Photographing | 10 |
| Photographing in person mode | 15 |
| Photographing in night view mode | 20 |
| Photographing by manual setting | 30 |
| Photographing of ten or more pictures in one day | 50 |

| Operation item | Points |
|---|---|
| Setting of wireless LAN | 10 |
| Setting of IP address | 10 |
| Check of Internet connection | 20 |
| Check of connection among plurality of devices | 30 |
| Completion of connection of 100 or more sites | 50 |

FIG.17

INFORMATION PROCESSING APPARATUS, INFORMATION PROCESSING METHOD, AND PROGRAM FOR CONVERTING PROFICIENCY LEVELS INTO INDICES

BACKGROUND

The present disclosure relates to an information processing apparatus and to an information processing method and a program for the information processing apparatus.

In recent years, a method of operating an electronic apparatus such as a mobile device has been complicated, and accordingly even a skilled user has a difficulty in fully using the electronic apparatus. In addition, an operation manual has also been complicated, and accordingly a user has a difficulty in finding out an operation method, which makes it difficult for the user to fully use the electronic apparatus by operating all functions of the electronic apparatus.

In such a situation, it is difficult for even a skilled user to know whether the skilled user him/herself fully uses all functions of the electronic apparatus.

Japanese Patent Application Laid-open No. 2007-233122 discloses an operation evaluation apparatus that monitors occurrence of a right event or a faulty event resulting from an operation of a vehicle during the operation by an operator, increases or decreases an operator's score in accordance with the occurrence of the event, and indicates the change of the score in real time as a band graph in front of an operator's seat of the vehicle.

SUMMARY

In the technique disclosed in Japanese Patent Application Laid-open No. 2007-233122, the operator can grasp how his/her operation is evaluated as his/her own score. However, the operator has no way to know scores of other operators, and other operators also have no way to know the score of the operator.

In view of the circumstances as descried above, it is desirable to provide an information processing apparatus, an information processing method, and a program that are capable of converting the proficiency levels in operation of a plurality of users into indices and causing the proficiency levels to be shared among the plurality of users.

According to an embodiment of the present disclosure, there is provided an information processing apparatus including a communication unit, a storage, and a controller. The storage is configured to store rule information indicating a rule for calculating points of a user in accordance with a type of an operation by the user. The controller is configured to calculate, based on a detected operation of a first user and the rule information, points of the first user in accordance with a type of the detected operation. Further, the controller is configured to control the storage to store first point information indicating the calculated points. In addition, the controller is configured to control the communication unit to perform one of transmission of the stored first point information to another information processing apparatus and reception of second point information from the other information processing apparatus, the second point information indicating points of a second user and being stored in the other information processing apparatus.

With this configuration, the information processing apparatus converts the proficiency level in operation of the user into points and transmits the points to another information processing apparatus or receives points of another user from the other information processing apparatus, with the result that a plurality of users can share their proficiency levels.

The controller may be configured to generate display information for displaying the stored first point information and the received second point information.

With this configuration, the information processing apparatus displays the point information of the plurality of users so that the plurality of users grasp the point information, with the result that the information processing apparatus can cause the plurality of users to compete against each other in the proficiency level in operation.

The controller may be configured to control the storage to store operation history information indicating the detected operation. Further, the controller may be configured to control the communication unit to perform one of transmission of the stored operation history information to the other information processing apparatus and reception of operation history information of the second user from the other information processing apparatus, the operation history information of the second user being stored in the other information processing apparatus.

With this configuration, the user and the other user can exchange operation information with each other and enhance the proficiency level in operation with each other.

The controller may be configured to calculate the points when a series of operations is completed.

With this configuration, as to a series of operations that have no meanings until completion of all the operation steps, the information processing apparatus calculates points when the completion of the series of operations is detected, with the result that the proficiency level on the series of operations can be correctly converted into points.

The controller may be configured to calculate the points for each of operations constituting a series of operations.

With this configuration, the information processing apparatus can convert the achievement in each step of the series of operations into points.

The controller may be configured to control the storage to store operation history information indicating the detected operation. Further, the controller may be configured to calculate a frequency of an operation detected after the operation history information is stored with respect to an operation stored as the operation history information, and calculate the points such that a value of the points becomes higher as the frequency becomes lower.

With this configuration, the information processing apparatus highly evaluates a new operation or a rare operation, for example, with the result that a motivation to operate a larger number of functions provided by the information processing apparatus can be given to the user.

The information processing apparatus may further include a display configured to display a first user interface for receiving the operation. In this case, the controller may be configured to control the display to change the first user interface to a second user interface in a case where a point value indicated by the stored first point information exceeds a predetermined threshold value, the second user interface being handled by an operation of a level higher than that for the first user interface.

With this configuration, the information processing apparatus can provide a user interface that corresponds to the proficiency level in operation of the user.

The storage may be configured to store a first application that provides a first user interface for receiving the operation. In this case, the controller may be configured to control the storage to update the first application to be a second application in a case where a point value indicated by the stored first point information exceeds a predetermined threshold value, the second application providing a second user interface handled by an operation of a level higher than that for the first user interface.

With this configuration, the information processing apparatus can provide an application of a version corresponding to the proficiency level in operation of the user.

The controller may be configured to control the communication unit to perform one of transmission of the first point information to another apparatus capable of operating in cooperation with the information processing apparatus and reception of third point information from the other apparatus, the third point information indicating the points of the first user and being stored in the other apparatus. Further, the controller may be configured to combine the first point information and the second point information.

With this configuration, the information processing apparatus can collectively evaluate a series of operations necessary in the information processing apparatus and a series of operations necessary in the other apparatus.

According to another embodiment of the present disclosure, there is provided an information processing method including: storing rule information indicating a rule for calculating points of a user in accordance with a type of an operation of the user; acquiring a detected operation of a first user; calculating points of the first user in accordance with a type of the detected operation based on the rule information; storing first point information indicating the calculated points; and performing one of transmission of the stored first point information to another information processing apparatus and reception of second point information from the other information processing apparatus, the second point information indicating points of a second user and being stored in the other information processing apparatus.

According to still another embodiment of the present disclosure, there is provided a program causing an information processing apparatus to execute: storing rule information indicating a rule for calculating points of a user in accordance with a type of an operation of the user; acquiring a detected operation of a first user; calculating points of the first user in accordance with a type of the detected operation based on the rule information; storing first point information indicating the calculated points; and performing one of transmission of the stored first point information to another information processing apparatus and reception of second point information from the other information processing apparatus, the second point information indicating points of a second user and being stored in the other information processing apparatus.

According to still another embodiment of the present disclosure, there is provided an information processing apparatus including a communication unit and a controller. The communication unit is configured to communicate with a server. The controller is configured to detect an operation of a first user. Further, the controller is configured to control the communication unit to transmit information on the detected operation of the first user to the server. In addition, the controller is configured to control the communication unit to perform one of transmission of first point information of the first user to another information processing apparatus by using the server, and reception of second point information from the server, the second point information indicating points of a second user who operates the other information processing apparatus. The first point information of the first user corresponds to a type of the detected operation and is calculated by the server based on the detected operation of the first user and rule information indicating a rule for calculating points of a user in accordance with a type of an operation of the user.

As described above, according to the present disclosure, it is possible to convert the proficiency levels in operation of a plurality of users into indices and cause the proficiency levels to be shared among the plurality of users.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 17 is a table showing a relationship between operations on settings of network connection and points to be added in accordance with the settings.

DETAILED DESCRIPTION OF EMBODIMENTS

Hereinafter, embodiments of the present disclosure will be described with reference to the drawings.

(Hardware Configuration of Mobile Terminal)

Figure 1:
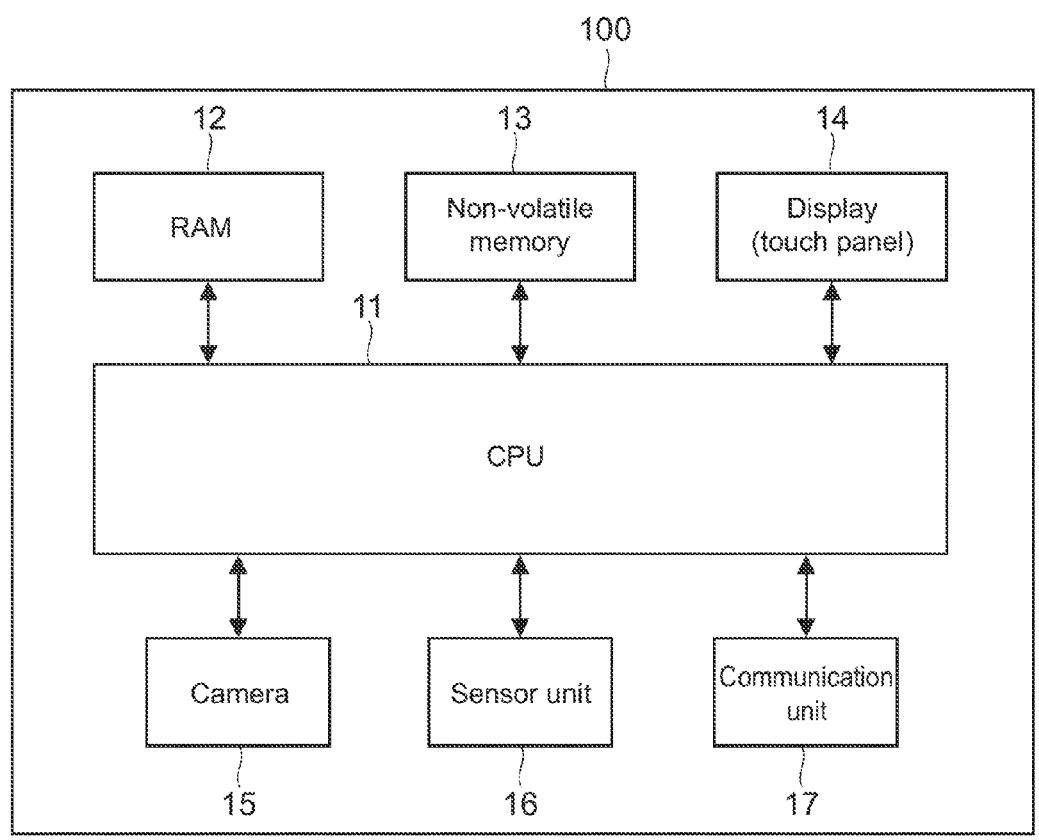
FIG. 1 is a block diagram showing a hardware configuration of a mobile terminal according to an embodiment of the present disclosure.

FIG. 1 is a block diagram showing a hardware configuration of a mobile terminal according to this embodiment. Here, the mobile terminal specifically refers to an information processing apparatus to which a function of a camera may be provided, such as a smartphone, a mobile phone, a tablet PC (Personal Computer), a digital still camera, a PDA (Personal Digital Assistant), a portable AV (Audiovisual) player, a portable game machine, and an electronic book.

As shown in FIG. 1, a mobile terminal 100 includes a CPU (Central Processing Unit) 11, a RAM (Random Access Memory) 12, a non-volatile memory 13, a display 14, a camera 15, a sensor unit 16, and a communication unit 17.

The CPU 11 accesses the RAM 12 and the like when necessary and performs overall control of whole blocks of the mobile terminal 100 while performing various types of computation processing. The RAM 12 is used as a work area or the like of the CPU 11 and temporarily stores an OS, various applications in execution, and various pieces of data being processed such as operation history data and tables to be described later.

The non-volatile memory 13 is a flash memory or a ROM (Read Only Memory), for example. The non-volatile memory 13 fixedly stores the OS to be executed by the CPU 11 and firmware such as various parameters and programs including software modules etc. to be described later.

Further, the non-volatile memory 13 stores still-image data (photographic data) and moving-image data that are captured with the camera 15. The photographic data may be stored with metadata such as data indicating a date and time of photographing, position data (latitude/longitude data) indicating a photographing position, and data indicating climatic conditions at the photographing (temperature, humidity, atmospheric pressure, etc.) being added to the photographic data.

Furthermore, the non-volatile memory 13 stores user operation history data on the camera 15, data indicating a set status (set value) that is set by the user operation, a table showing a relationship between a type of the operation and points to be added for the type of the operation (point addition rule), points added according to the table, and the like.

The display 14 is an LCD (Liquid Crystal Display) or an OELD (Organic ElectroLuminescence Display), for example, and is configured to display various menus, GUIs of applications, and the like. Typically, the display 14 is formed integrally with a touch panel and is capable of receiving a touch operation of a user. In other words, the display 14 also functions as an operation detection unit.

Though not shown in the figure, the mobile terminal 100 includes a hardware button such as a shutter button as the operation detection unit.

The camera 15 captures a still image (photograph) and a moving image by using an imaging device such as a CMOS (Complementary Metal Oxide Semiconductor) or CCD (Charge Coupled Device) sensor. The camera 15 has various functions such as a function of selecting various photographing modes including night view mode, person mode, etc., a panoramic photographing function, a 3D photographing function, a white-balance adjustment function, and an aperture adjustment function. The user can operate the above-mentioned display 14 (touch panel) and the like to set those functions.

The sensor unit 16 is constituted of various sensors and configured to detect position information (latitude and longitude information), orientation information, physical information (acceleration and gravity), and the like of the mobile terminal 100. The position information is detected with a GPS (Global Positioning System) sensor, for example. Further, the position information may be detected by performing trilateration with a base station by wireless communication of the communication unit 17. The orientation information is detected with a geomagnetic sensor, for example. The physical information is detected with an angular velocity (gyro) sensor or an acceleration sensor. However, the mobile terminal 100 may not necessarily include the sensor unit 16.

The communication unit 17 communicates with another apparatus using a wireless LAN (IEEE802.11 or the like) such as Wi-Fi (Wireless Fidelity) or a 3G or 4G network for mobile communications. For example, the communication unit 17 is used for accessing a server on the Internet (for example, SNS (Social Networking Service)) to upload the captured photographic data or communicating with an adjacent mobile terminal to share the photographic data.

(Software Configuration of Mobile Terminal)

Figure 2:
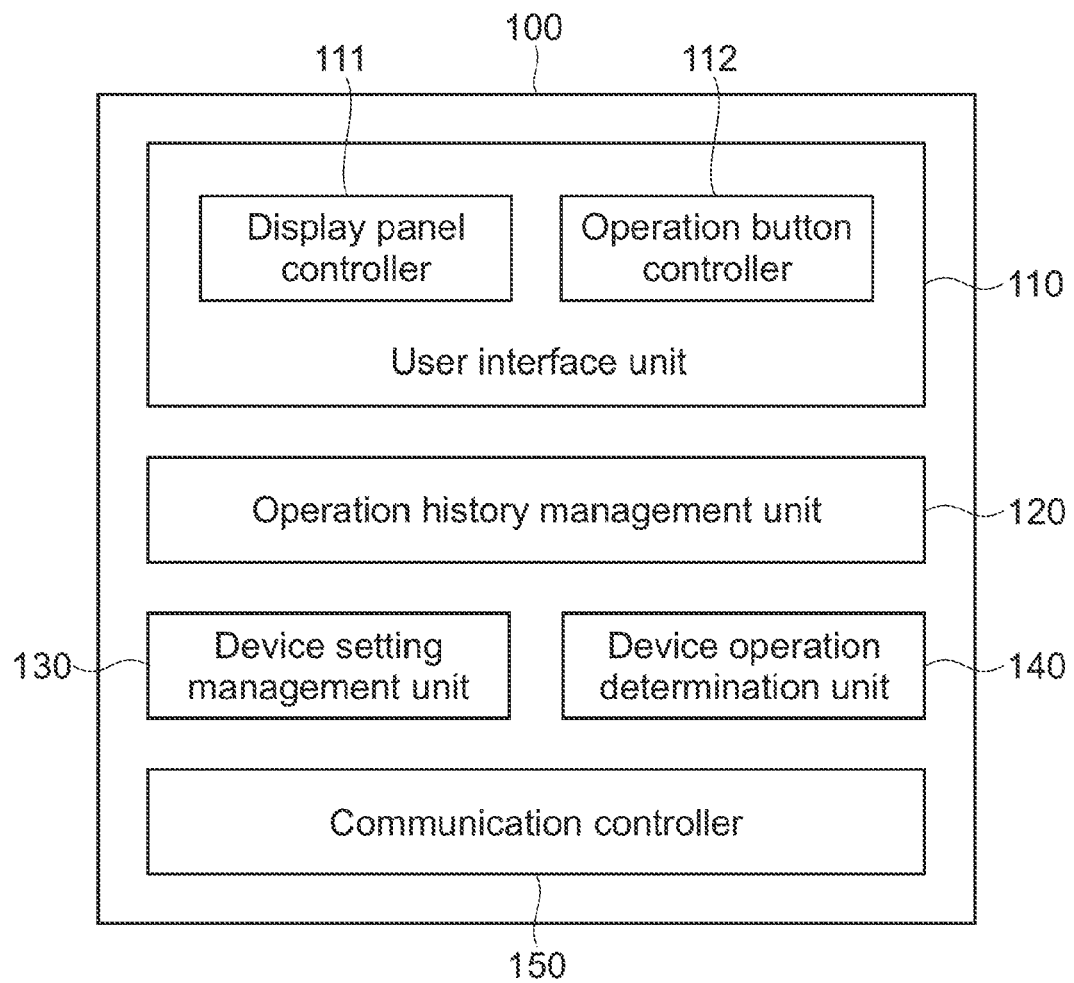
FIG. 2 is a block diagram showing a software configuration of the mobile terminal.

FIG. 2 is a diagram showing the configuration of software modules included in the mobile terminal 100.

In this embodiment, the mobile terminal 100 can give points to the user, i.e., add points in accordance with details of an operation of the user on the camera 15. As shown in FIG. 2, the mobile terminal 100 includes, for the point giving processing, software modules serving as a user interface unit 110, an operation history management unit 120, a device setting management unit 130, a device operation determination unit 140, and a communication controller 150.

The user interface unit 110 includes a display panel controller 111 and an operation button controller 112 and provides a user interface for receiving an operation from the user via the display 14, a hardware operation button, and the like. As will be described later, the user interface unit 110 can provide a user interface by switching a plurality of user interfaces that are different in the difficulty level in operation.

The operation history management unit 120 functions as a database in which various operations performed by the user via the user interface unit 110 are stored. Basically, all pieces of operation history information are managed by and stored in the operation history management unit 120.

Further, when adding points for a series of operations, the operation history management unit 120 manages details of the operations as an operation list, separately from the operation history information described above.

Furthermore, the operation history management unit 120 also stores point information indicating points given (added) to the user in accordance with an operation. When the user uses the mobile terminal 100 for the first time, the point information is set to 0 points. Each time an operation is detected, predetermined points are added to the point information in accordance with the operation.

The device setting management unit 130 manages set statuses of various settings performed on the mobile terminal 100 according to operations of the user.

The device operation determination unit 140 determines the details (type) of the detected operation and adds points in accordance with the determined operation based on the table described above.

Further, the device operation determination unit 140 determines how the operation performed on the mobile terminal 100 is different from an operation stored in the operation history management unit 120 (whether the operation performed on the mobile terminal 100 is a new operation or an operation performed every day), or whether the operation performed on the mobile terminal 100 is different from an operation performed by another user, for example.

The communication controller 150 includes wireless and wired communication interfaces and exchanges information with another device or a server on a network.

(Point Addition Rule)

Figures 3, 4:
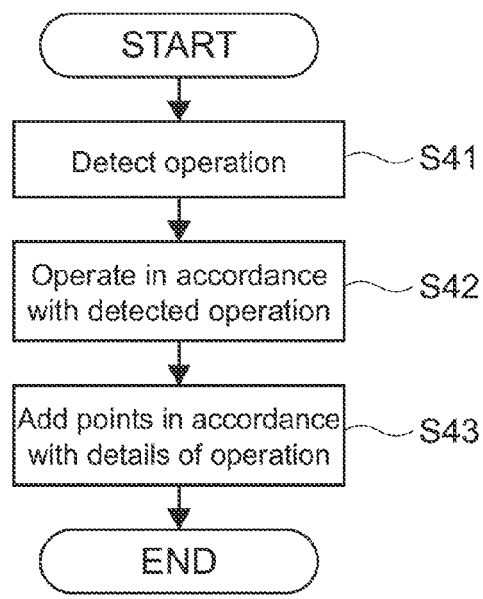
FIG. 3 is a table showing a relationship between types of user operations on a camera of the mobile terminal and points to be added for the user operations (point addition rule)
FIG. 4 is a flowchart showing a basic flow of point addition processing in the mobile terminal.

FIG. 3 is a diagram showing an example of a table showing a relationship between types of photographing operations of the user using the camera 15 and points to be added for the photographing operations (point addition rule). The table is stored in the non-volatile memory 13 (device operation determination unit 140), for example.

As shown in FIG. 3, in the table, points are assigned to operation items such as a photographing operation, a photographing operation in person mode, a photographing operation in night view mode, a photographing operation by manual setting, and a photographing operation of ten or more pictures in one day.

Typically, higher points are assigned to an operation of a higher difficulty level, that is, an operation that involves a lot of skills. For example, it is said that the photographing operation in night view mode or person mode and the photographing operation by manual setting have a higher difficulty level than the mere photographing operation. Therefore, higher points are assigned to the photographing operation in night view mode or person mode and the photographing operation by manual setting.

As a matter of course, the camera 15 has many other functions associated with photographing in addition to the functions corresponding to the operation items described above. Accordingly, operation items managed in the table are not limited to those shown in FIG. 3.

For example, relatively high points may be assigned to a photographing operation following a tutorial, because it is thought that a user repeats operations following a manual and thus the proficiency level in operation is improved.

(Operation of Mobile Terminal)

Next, operations of the mobile terminal 100 configured as described above will be described. In this embodiment and other embodiments, the operations of the mobile terminal 100 are performed in cooperation with the CPU 11 and the software modules executed under the control of the CPU 11.

FIG. 4 is a flowchart showing a basic flow of point addition processing of the mobile terminal 100 in this embodiment.

As shown in FIG. 4, the CPU 11 of the mobile terminal 100 receives an operation of the user via the user interface unit 110 (Step 41).

Subsequently, the CPU 11 operates in accordance with the received operation (Step 42). For example, the CPU 11 executes photographing processing in the case of receiving a photographing operation.

Then, the CPU 11 determines details (type) of the operation and adds points to the point information in accordance with the determined details of the operation based on the table (Step 43).

The points are displayed on the display 14 in response to a request of the user, for example.

Hereinafter, a specific example of the point addition processing that is based on the processing described above will be described. In this embodiment, the mobile terminal 100 can execute three types of point addition processing. In any one of the specific examples to be described below, an example in which points are added for a series of operations will be described.

(First Specific Example of Point Addition Processing)

Figure 5:
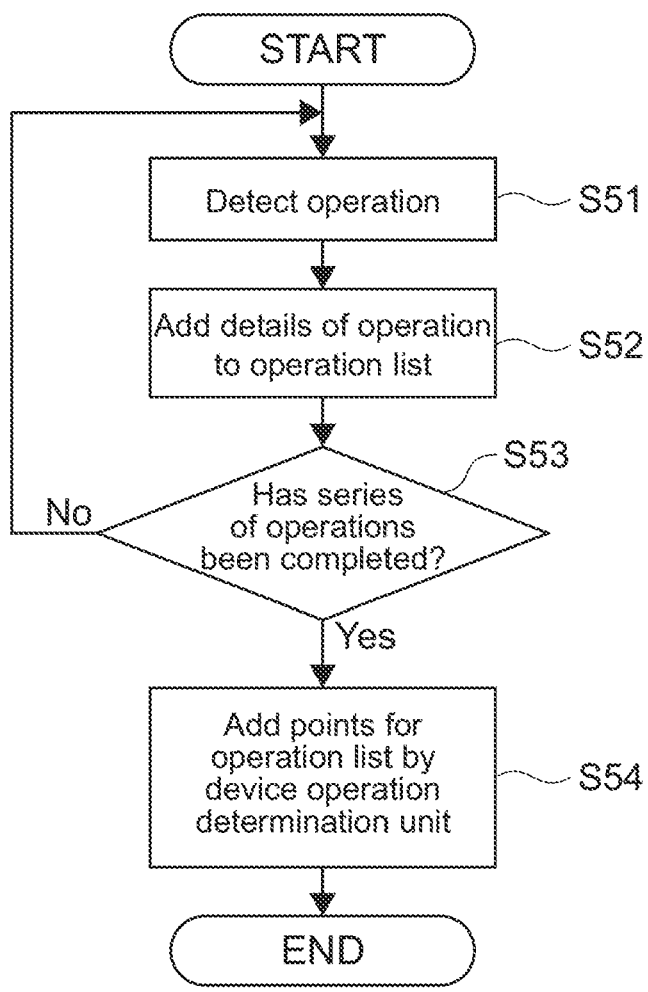
FIG. 5 is a flowchart showing a flow of a first specific example of the point addition processing in the mobile terminal.

FIG. 5 is a flowchart showing a flow of a first specific example of the point addition processing in the mobile terminal 100.

As shown in FIG. 5, upon detection of an operation of the user on the mobile terminal 100 (Step 51), the CPU 11 adds details of the operation to the operation list (Step 52).

Subsequently, the CPU 11 determines whether a series of operations has been completed based on the operation list (Step 53).

When determining that the series of operations has been completed (Yes), the CPU 11 causes the device operation determination unit 140 to add points for the operation list, that is, points for the whole series of operations to the point information (Step 54).

On the other hand, when determining that the series of operations has not been completed (No), the CPU 11 repeats the processing of Step 51 and the subsequent steps until the series of operations is completed.

Through such processing, points are not added for the respective operations constituting the series of operations, and points are added when all the operations constituting the series of operations are completed.

The series of operations in this example refers to a plurality of operations that have no meanings or do not achieve a predetermined function until completion of all the operations. Examples of such operations include operations of, in white-balance setting processing: 1. opening a setting screen, 2. setting indoor photographing mode in scene selection mode, 3. adjusting white balance, and 4. closing a setting screen.

Through the above processing, a proficiency level in the operations that have no meanings until completion of all the operations can be correctly evaluated.

(Second Specific Example of Point Addition Processing)

Figure 6:
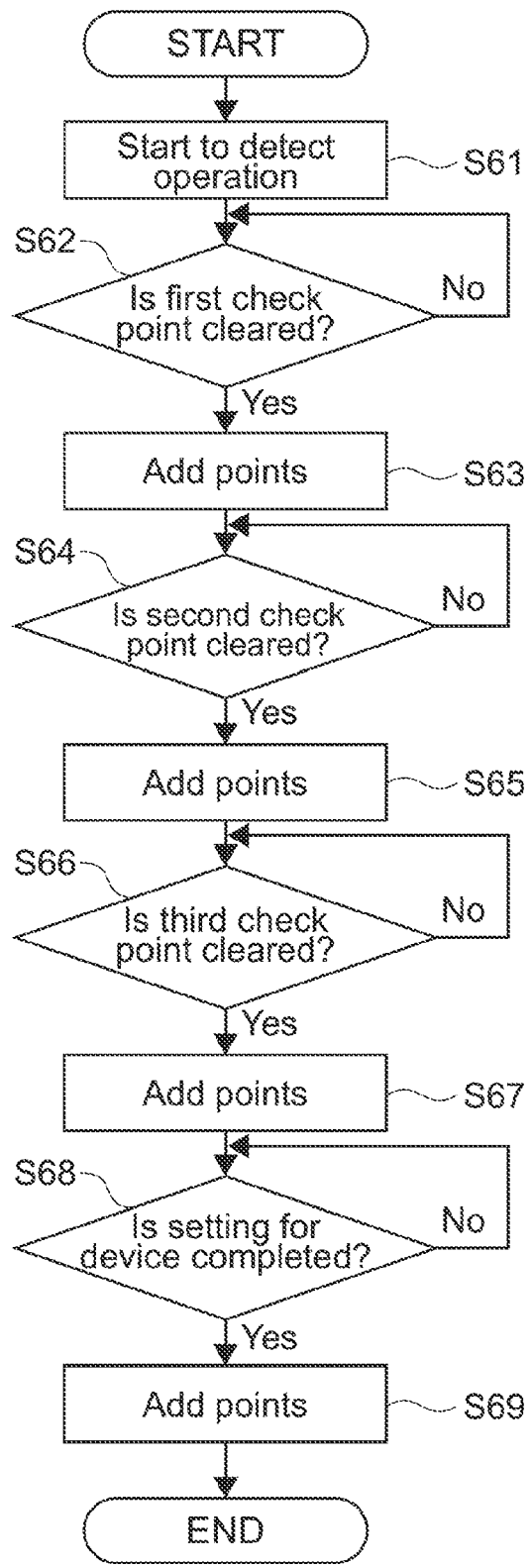
FIG. 6 is a flowchart showing a flow of a second specific example of the point addition processing in the mobile terminal.

FIG. 6 is a flowchart showing a flow of a second specific example of the point addition processing in the mobile terminal 100. In this example, an operation in each step in a series of operations performed in a plurality of steps is expressed as a "check point". For example, a case where a series of setting operations has four check points is assumed.

As shown in FIG. 6, upon detection of an operation of the user on the mobile terminal 100 (Step 61), the CPU 11 determines whether a first check point is cleared or not (Step 62).

When determining that the first check point is cleared (Yes), the CPU 11 causes the device operation determination unit 140 to add points corresponding to the first check point to the point information (Step 63).

Subsequently, the CPU 11 detects another operation and then determines whether a second check point is cleared or not (Step 64).

When determining that the second check point is cleared (Yes), the CPU 11 causes the device operation determination unit 140 to add points corresponding to the second check point to the point information (Step 65).

Subsequently, the CPU 11 detects another operation and then determines whether a third check point is cleared or not (Step 66).

When determining that the third check point is cleared (Yes), the CPU 11 causes the device operation determination unit 140 to add points corresponding to the third check point to the point information (Step 67).

Subsequently, the CPU 11 detects another operation and then determines whether a fourth check point is cleared or not, that is, whether settings for the device are completed or not (Step 68).

When determining that settings for the device are completed (Yes), the CPU 11 causes the device operation determination unit 140 to add points corresponding to the fourth check point to the point information (Step 69).

Through such processing, points are added every time each of the operations constituting the series of operations is detected (cleared). As the number of cleared check points becomes larger, many points are added.

The series of operations in this example is different from that of the first specific example. The series of operations in this example refers to operations performed in a plurality of steps, and each of the operations produces a certain meaning when the operation is completed in each step even if all the operations are not completed. Examples of such operations include operations of, in a series of operations of taking a picture with the camera 15 and uploading the picture to an SNS: 1. setting an account of the mobile terminal 100; 2. taking a picture; and 3. uploading the picture to an SNS.

(Third Specific Example of Point Addition Processing)

Figure 7:
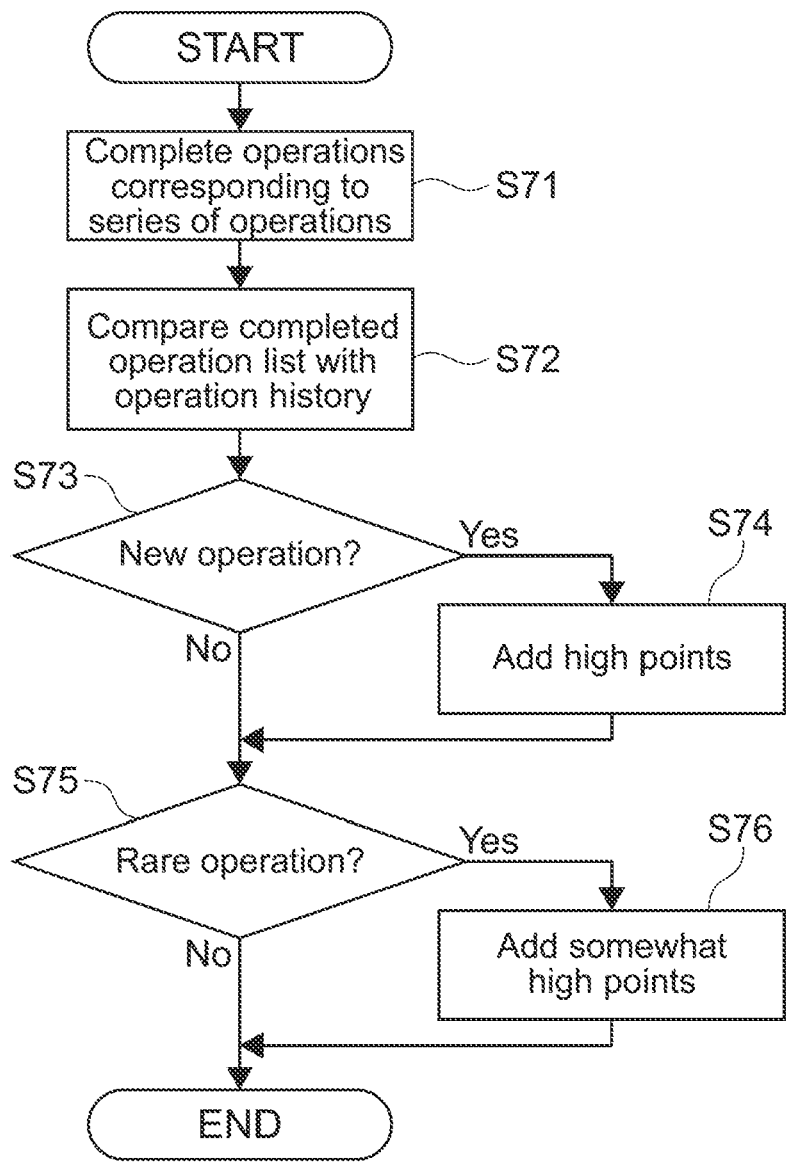
FIG. 7 is a flowchart showing a flow of a third specific example of the point addition processing in the mobile terminal.

FIG. 7 is a flowchart showing a flow of a third specific example of the point addition processing in the mobile terminal 100.

As shown in FIG. 7, upon completion of operations corresponding to the series of operations as described above (Step 71), the CPU 11 first causes the device operation determination unit 140 to compare the operation list in which the series of operations is recorded and the operation history information (Step 72).

The device operation determination unit 140 calculates a frequency of the series of operations in the operation list with respect to the operation history information, to thereby determine whether the series of operations is a new operation or a rare operation (Steps 73 and 75). The rare operation refers to an operation that appears only several times in the operation history information, for example.

When determining that the series of operations is a new operation (Yes in Step 73), the CPU 11 causes the device operation determination unit 140 to add high points to the point information (Step 74).

When determining that the series of operations is a rare operation (Yes in Step 75), the CPU 11 causes the device operation determination unit 140 to add somewhat high points to the point information (Step 76).

Thought such processing, a current operation status of the user is compared with the past operation history. Then, higher points are added for the current operation of the user performed at a smaller frequency.

This is because, assuming that a satisfaction level of the user is enhanced when the user fully use all the functions provided by the mobile terminal 100, it is naturally thought that more points are to be given to the user when the user uses as many functions as possible. For example, in the case where a user who usually takes pictures in normal photographing mode uses night view mode for the first time to take a picture, high points are given to the user.

(User Interface Change in Accordance with Points)

It is thought that as more points are added through the point addition processing described above, the proficiency level in operation of the user is more enhanced, and accordingly the user can gradually handle a higher-level user interface or desires to use a higher-level user interface.

In this regard, in this embodiment, the mobile terminal 100 prepares in advance a plurality of user interfaces each having a different difficulty level in operation and changes the user interfaces in accordance with the points.

Figure 8:
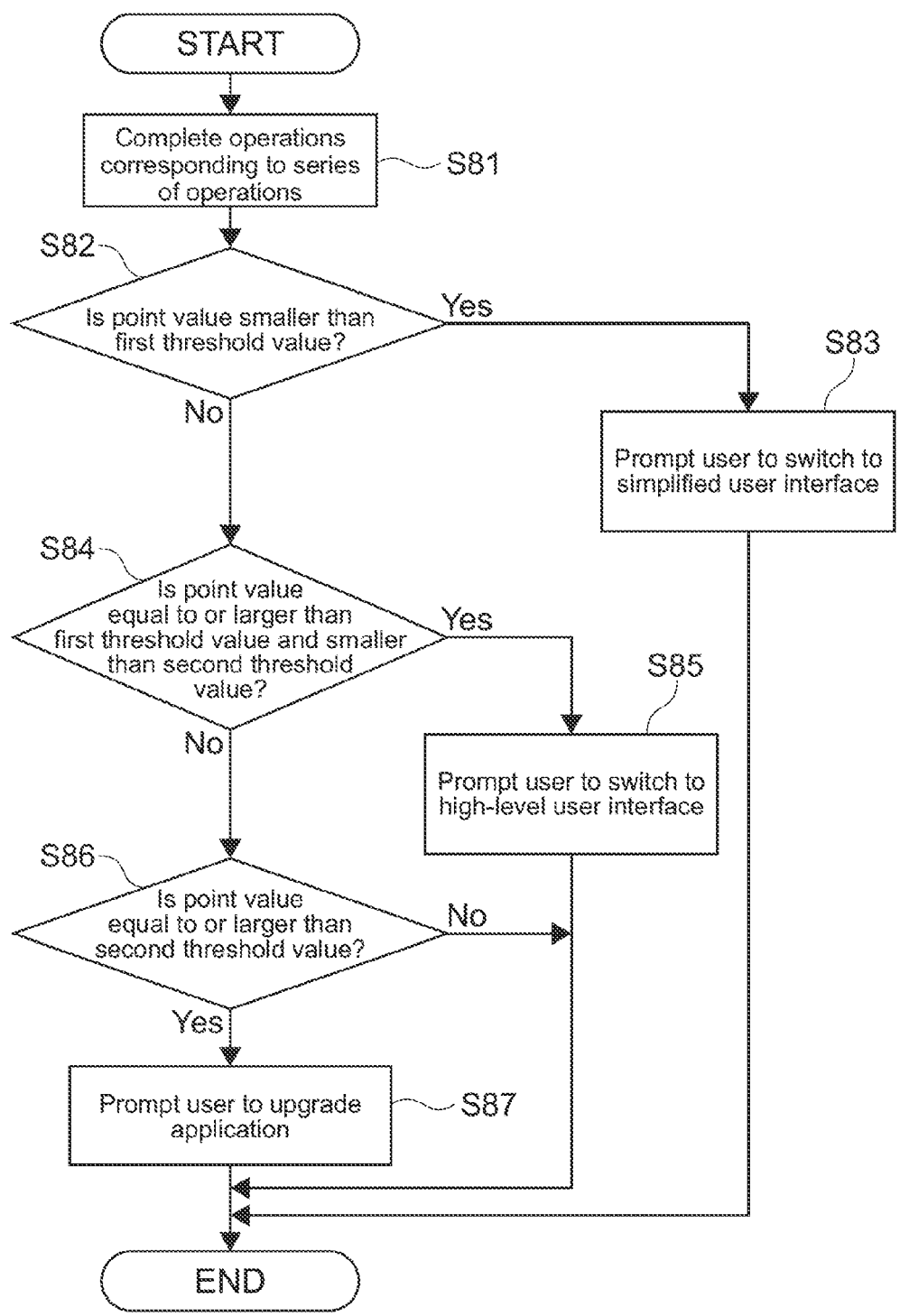
FIG. 8 is a flowchart showing a flow of user interface change processing corresponding to points in the mobile terminal.

FIG. 8 is a flowchart showing a flow of the user interface change processing. In FIG. 8, the mobile terminal 100 provides a normal user interface by default. In addition thereto, the following two user interfaces are prepared. One of them is a user interface of a high difficulty level in operation, which is handled by a high-level operation, and the other one is a user interface of a low difficulty level in operation, i.e., a simplified user interface.

As shown in FIG. 8, upon completion of operations corresponding to the series of operations as described above (Step 81), the CPU 11 first determines whether the current point value is smaller than a predetermined first threshold value or not (Step 82).

When determining that the current point value is smaller than a predetermined first threshold value (Yes), the CPU 11 displays on the display 14 a message to prompt the user to switch the normal user interface to a simplified user interface (Step 83). For example, the message has a button for approving the switching of the user interface and a button for refusing the switching. When the user presses the button for approval, the user interface unit 110 switches the normal user interface currently set to the simplified user interface.

When determining that the current point value is equal to or larger than the first threshold value (No in Step 82), the CPU 11 determines whether the current point value is equal to or larger than the first threshold value and smaller than a second threshold value that is larger than the first threshold value (Step 84).

When determining that the current point value is equal to or larger than the first threshold value and smaller than the second threshold value (Yes), the CPU 11 displays on the display 14 a message to prompt the user to switch the normal user interface to a high-level user interface (Step 85). The message in this case also has the button for approval and the button for refusal. When the user presses the button for approval, the user interface unit 110 switches the normal user interface currently set to the high-level user interface.

When determining that the current point value is equal to or larger than the second threshold value (No in Step 84 and Step 86), the CPU 11 displays on the display 14 a message to prompt the user to upgrade an application on the user interface (Step 87). The message in this case also has the button for approval and the button for refusal. When the user presses the button for approval, the user interface unit 110 acquires an upgraded version of the application currently installed from a predetermined application server via the communication controller 150 and executes the upgraded version of the application.

Figure 9:
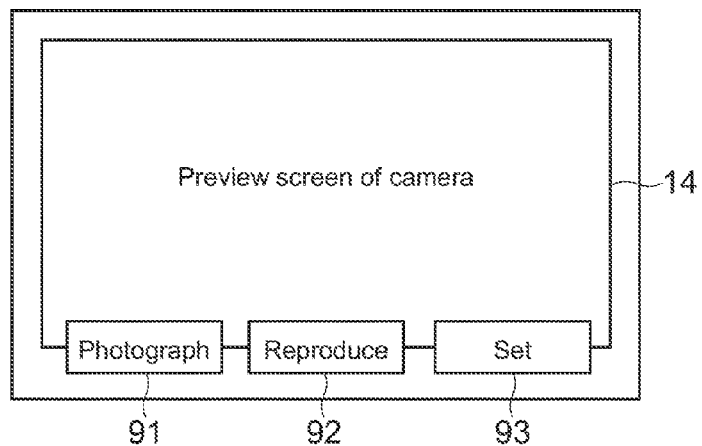
FIG. 9 is a diagram showing an example of a user interface of a normal difficulty level in operation.
Figure 10:
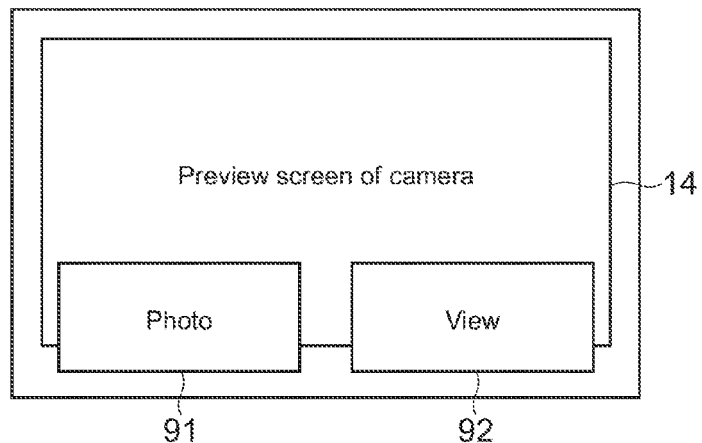
FIG. 10 is a diagram showing an example of a user interface of a low difficulty level in operation.
Figure 11:
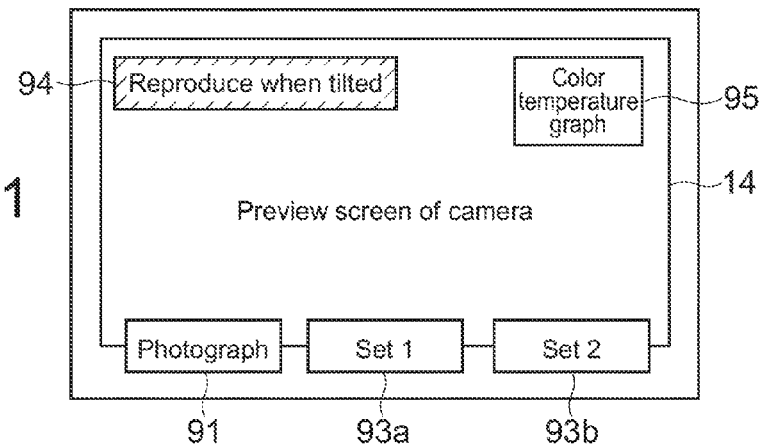
FIG. 11 is a diagram showing an example of a user interface of a high difficulty level in operation.

FIG. 9 is a diagram showing an example of the user interface of a normal difficulty level in operation. FIG. 10 is a diagram showing an example of the user interface of a low difficulty level in operation (simplified user interface). FIG. 11 is a diagram showing an example of the user interface of a high difficulty level in operation. FIGS. 9, 10, and 11 each show an example of a user interface on a photographing screen of a camera.

As shown in FIG. 9, the normal user interface includes three buttons, i.e., a photographing button 91, a reproduction button 92, and a setting button 93, on the lower side of a preview screen of the camera, for example.

As shown in FIG. 10, in the simplified user interface, the setting button 93 in the normal user interface is removed, and only the photographing button 91 and the reproduction button 92 are provided. Additionally, the names of the respective buttons are expressed with words that are easily understood, such as "Photo" and "View". In other words, the simplified user interface is a user interface specialized for photographing and reproduction.

As shown in FIG. 11, the high-level user interface does not have the reproduction button 92 of the normal user interface as an operation button and has two setting buttons (setting buttons 93a and 93b) instead. Those two setting buttons 93 allow the user to make various photographing settings.

Further, the high-level user interface does not have the reproduction button 92 as a reproduction function. Instead, reproduction is achieved by an operation of tilting a casing of the mobile terminal 100. A message 94 indicating that the reproduction is started by the tilt operation is displayed on the upper left of the preview screen of the camera, for example.

In addition, in the high-level user interface, a color temperature graph 95 is also displayed on the upper right of the preview screen of the camera, for example. Thus, a further higher-level setting corresponding to color temperature can be made.

Figure 12:
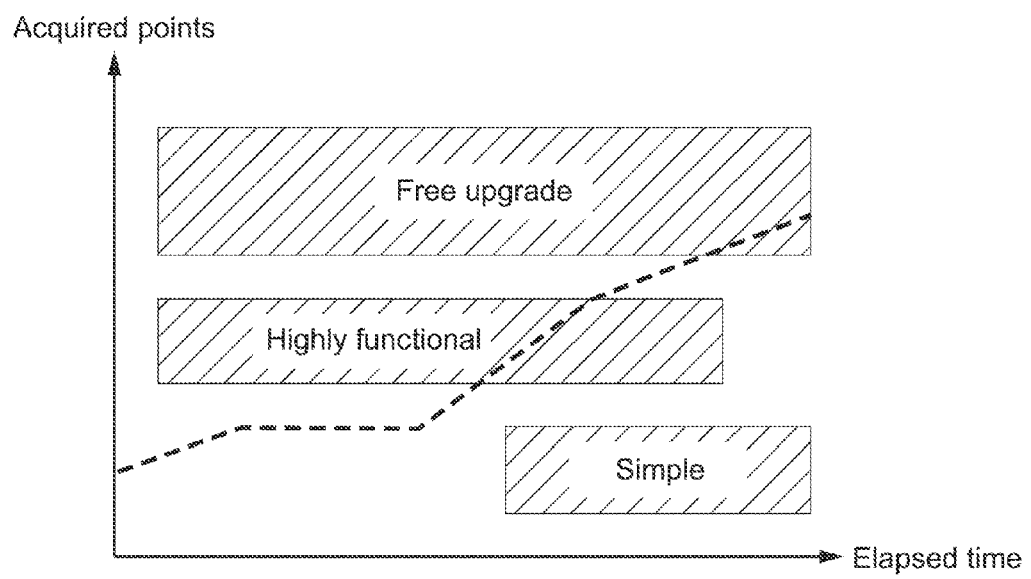
FIG. 12 is a graph showing the user interface change processing in terms of a relationship between an elapsed time and points.

FIG. 12 is a graph showing the user interface change processing in terms of a relationship between an elapsed time and points. In FIG. 12, the horizontal axis indicates an elapsed time, and the vertical axis indicates points. Further, a broken line indicates the transition of points, and blocks with hatching indicate the transition of user interface.

As shown in FIG. 12, in the case where a time elapses with the point value being kept small, the user interface is prompted to be simple. When the point value of the user becomes higher along with the lapse of time, the user interface is prompted to be highly functional. When the point value of the user becomes further higher, the software is prompted to be upgraded.

(Point-Information Sharing Processing Among a Plurality of Users)

Up to here, the point addition processing for one user of the mobile terminal 100 has been described. By confirming the points, the user can grasp his/her absolute proficiency level in operation. However, there is a case where the user intends to grasp his/her relative proficiency level in operation after comparing his/her points with points of other users.

In this regard, in this embodiment, pieces of point information of a plurality of users are exchanged among a plurality of devices via a server so that the pieces of point information of the plurality of users can be shared among the users.

Figure 13:
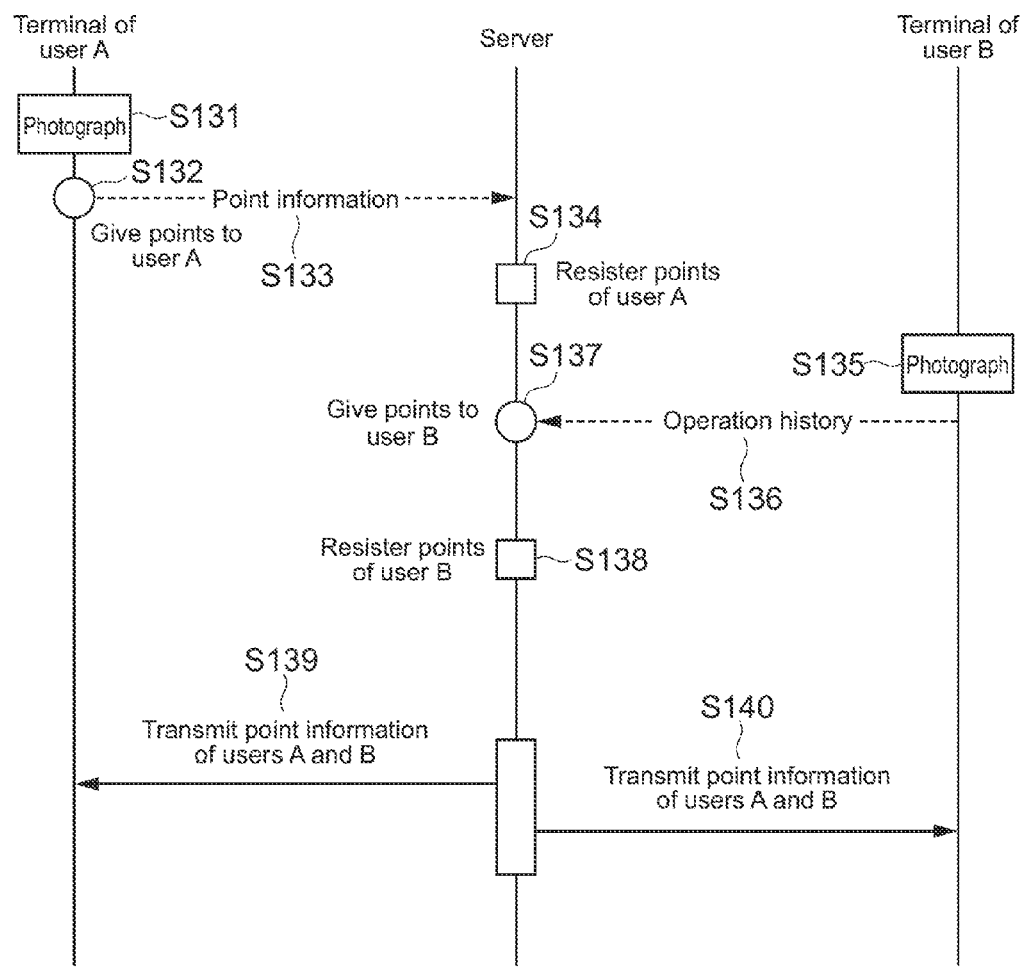
FIG. 13 is a sequence diagram showing a flow of point-information sharing processing among a plurality of devices.

FIG. 13 is a sequence diagram showing a flow of point-information sharing processing among a plurality of devices.

In FIG. 13, assumed is a case where two users, i.e., a user A of a mobile terminal 100A and a user B of another mobile terminal 100B take pictures with cameras of the respective mobile terminals.

Further, in FIG. 13, the two mobile terminals are connectable to a server on a cloud. The server can store pieces of point information of a plurality of users and give points corresponding to a type of operation to the respective users based on operation information of the plurality of users.

Point addition processing and point-information storage processing may be performed by the mobile terminals 100. Alternatively, at least one of the point addition processing and the point-information storage processing may be performed by the server. For that reason, the server stores a table showing the point addition rule as shown in FIG. 3.

FIG. 13 shows an example in which the mobile terminal 100A executes point addition processing and the mobile terminal 100B requests the server to execute the point addition processing.

As shown in FIG. 13, upon reception of a photographing operation from the user A (Step 131), the mobile terminal 100A adds points corresponding to the above operation to point information of the user A (Step 132).

Subsequently, the mobile terminal 100A transmits the point information and a user ID for identifying the user A, for example, to the server (Step 133). The server receives the point information and stores the point information with the user ID (Step 134).

Meanwhile, upon reception of a photographing operation from the user B (Step 135), the mobile terminal 100B transmits operation information (operation history information) of the user B and a user ID of the user B, for example, to the server (Step 136).

The server receives the operation information of the user B from the mobile terminal 100B and gives points to the user B in accordance with the type of operation (photographing operation) indicated by the operation information (Step 137). Then, the server stores the point information with the user ID described above (Step 138).

After that, for example, in response to requests from the mobile terminal 100A and the mobile terminal 100B or periodically, the server transmits the point information of the user A and the point information of the user B, which are stored in the server, to the mobile terminal 100A and the mobile terminal 100B (Steps 139 and 140).

Through such processing, the mobile terminal 100A and the mobile terminal 100B can share the point information of the respective users.

(Point-Information Display Processing Among a Plurality of Users)

Through the point-information sharing processing described above, the mobile terminal 100A can display the point information of the user A of the mobile terminal 100A and the received point information of the user B of the mobile terminal 100B in a comparable manner.

Figure 14:
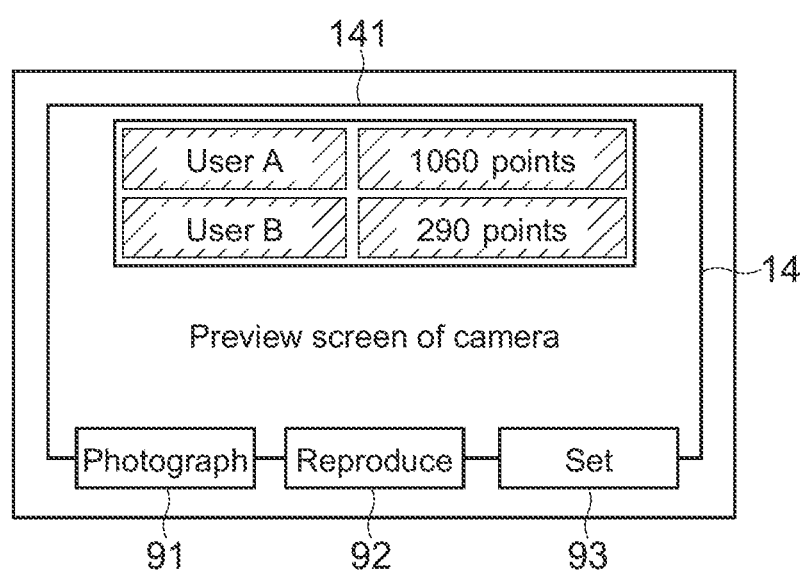
FIG. 14 is a diagram showing an example in which points of the user of the mobile terminal and points of a user of another device are displayed.

FIG. 14 is a diagram showing an example in which points of the user A of the mobile terminal 100A and points of the user B of the mobile terminal 100B are displayed.

As shown in FIG. 14, the mobile terminal 100A displays the point information of the user A and the point information of the user B side by side on the display 14, for example, in a point-information display area 141 of the preview screen of the camera.

Accordingly, the mobile terminal 100A causes the user A to compare the point information of the user A and the point information of the user B displayed on the display 14, with the result that the user A can grasp a relative proficiency level in operation of the user A. Further, the mobile terminal 100A can cause the user A and the user B to compete against each other in the proficiency level in operation and can eventually improve the proficiency levels in operation of the users A and B like a game.

(Setting-Information and Operation-History-Information Sharing Processing Among a Plurality of Users)

Through the above-mentioned point-information display processing among a plurality of users, the user A of the mobile terminal 100A may become more competitive with the user B in terms of the proficiency level in operation. On the other hand, in the case where the user A finds out that his/her point value is smaller than that of the user B, the user A may want to imitate the setting information or operation history of the user B who is skilled in operations (has high points) or to get advice on the settings from the user B.

In this regard, in this embodiment, the mobile terminal 100 causes a user having higher points and a user having lower points to share setting information based on operations or operation history information.

Figure 15:
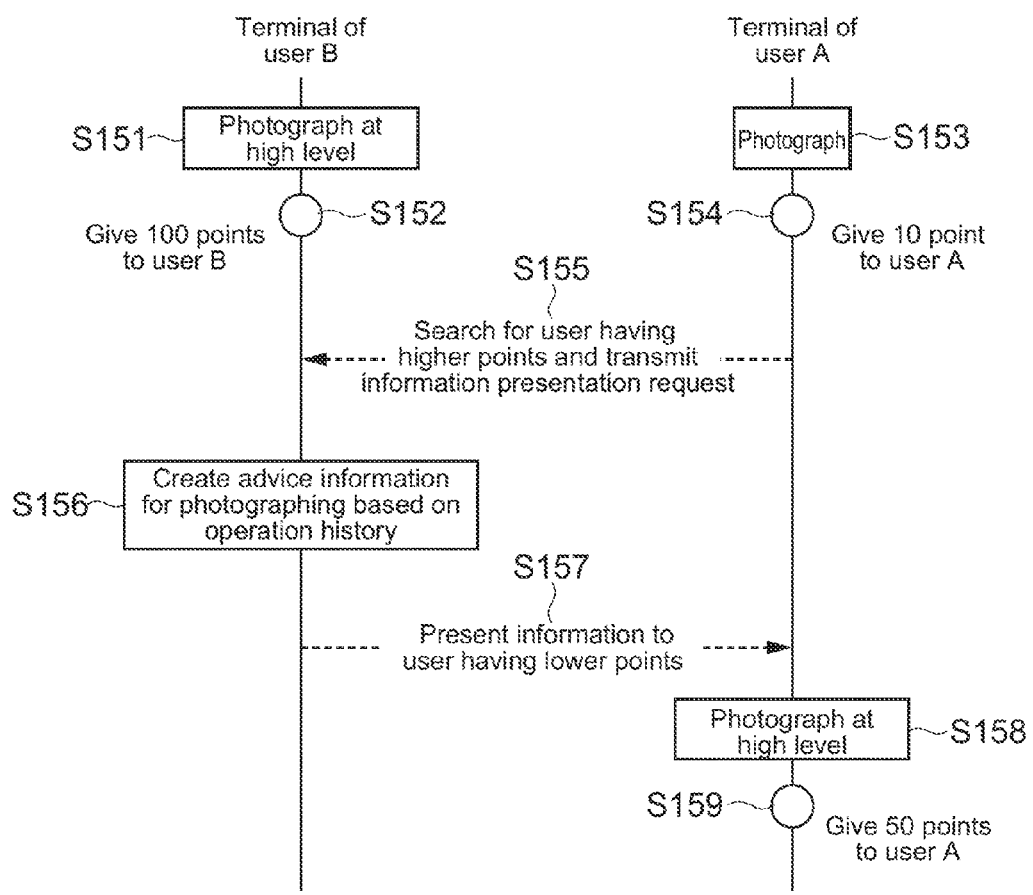
FIG. 15 is a sequence diagram showing a flow of setting-information and operation-history-information sharing processing among a plurality of users.

FIG. 15 is a sequence diagram showing a flow of setting-information and operation-history-information sharing processing among a plurality of users. It is assumed in FIG. 15 that the user A is a beginner and the user B is a skilled person on camera.

As shown in FIG. 15, the user B can perform high-level photographing by a manual setting operation, for example, and therefore higher points are given to the user B (Steps 151 and 152). On the other hand, the user A performs only a normal photographing operation in FIG. 15, and therefore lower points corresponding to the operation are given to the user A (Steps 153 and 154).

In such a case, the mobile terminal 100A searches for a mobile terminal of a user having higher points than those of the user A according to an instruction of the user A. Then, the mobile terminal 100A transmits an information presentation request to the mobile terminal 100B, which is found by the search of the mobile terminal 100A (Step 155).

The mobile terminal 100B receives the information presentation request and then creates advice information for photographing based on operation history information (Step 156). Examples of the advice information for photographing include information obtained by converting the operation history information into character information or image information (flowchart etc.) and information on various settings based on operations. More specifically, the advice information is, for example, information indicating by what operation and to what value white balance and an aperture are adjusted under what condition of current weather information. In this case, the mobile terminal 100B may add message information based on an input of a text or the like by the user B to the advice information as part of the advice information.

The created advice information is transmitted to the mobile terminal 100A of the user A as a response to the information presentation request (Step 157).

The user A of the mobile terminal 100A that has received the advice information executes a high-level photographing operation based on the advice information (Step 158), and the mobile terminal 100A obtains high points in accordance with the high-level photographing operation (Step 159).

(Conclusion)

As described above, in this embodiment, the mobile terminal 100 can add points in accordance with the type of operation made on the mobile terminal 100 by the user, to thereby provide the user with an index with which the user can objectively determine the proficiency level in operation on the mobile terminal 100. Further, since the point information, the operation history information, or the like is shared among a plurality of users, the user can obtain primary convenience obtained by using the mobile terminal 100 and in addition, secondary fun obtained when users compare and enhance their proficiency levels in operation with each other.

MODIFIED EXAMPLES

The present disclosure is not limited to the embodiment described above and may be variously modified without departing from the gist of the present disclosure.

Modified Example 1

In the embodiment described above, the point addition processing that corresponds to operations of a user in a single device (mobile terminal 100) has been described. However, in order that the user achieves a predetermined purpose, it may be necessary for the user to perform a series of operations on a plurality of cooperative devices. In this case, points are given to the user for each operation or the whole of operations constituting a series of operations made on a plurality of devices.

Examples of the series of operations made on a plurality of devices include operations, by one user, of displaying a picture taken with a mobile terminal (camera) on a television. In addition thereto, a series of operations performed over a plurality of devices may be executed in various combinations of devices, such as a combination of a mobile terminal and a recorder, a combination of a mobile terminal and a PC (Personal Computer), and a combination of a television and a recorder. Hereinafter, point addition processing corresponding to a series of operations performed by one user (user A) on the mobile terminal described above and a television will be described as an example.

Figure 16:
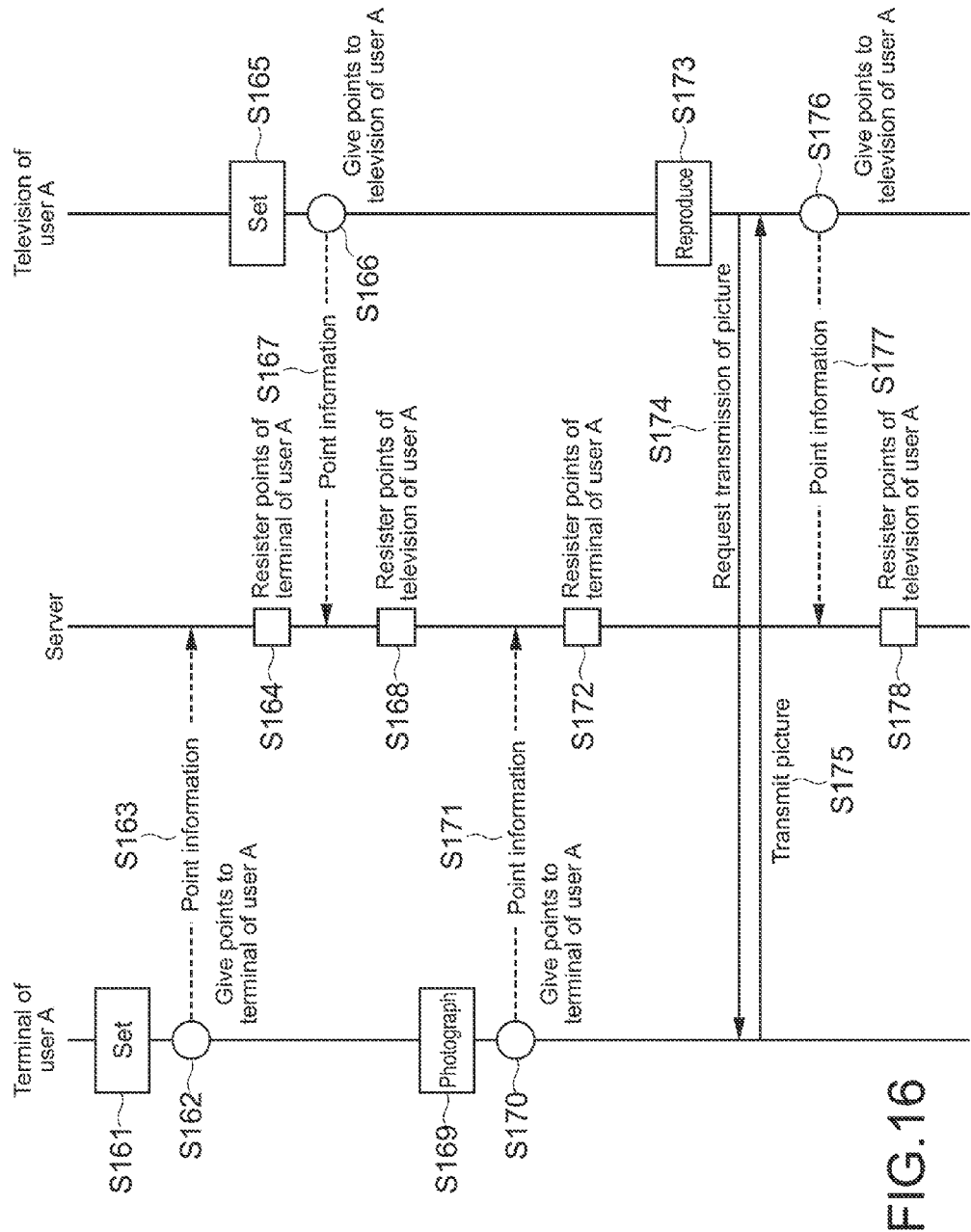
FIG. 16 is a sequence diagram showing a flow of the point addition processing corresponding to operations of users in a plurality of cooperative devices.

FIG. 16 is a sequence diagram showing a flow of the point addition processing corresponding to operations of a user in a plurality of cooperative devices.

As shown in FIG. 16, first, a mobile terminal of the user A receives a setting operation that is necessary for photographing with use of a camera and for connection with the television (Step 161) and adds points corresponding to the setting operation to point information of the user A (Step 162).

Sequentially, the mobile terminal transmits the point information of the user A to a server on a cloud (Step 163). The server receives the point information from the mobile terminal and stores the point information therein (Step 164).

Meanwhile, the television of the user A receives a setting operation that is necessary for reproduction of a picture taken with the mobile terminal and for connection with the mobile terminal (Step 165) and adds points corresponding to the setting operation to the point information of the user A (Step 166).

Subsequently, the television transmits the point information of the user A to the server (Step 167). The server receives the point information from the television and stores the point information therein (Step 168).

Subsequently, the mobile terminal receives a photographing operation using a camera of the user A (Step 169) and adds points corresponding to the photographing operation to the point information of the user A (Step 170), similar to the case of the setting operation described above.

Subsequently, the mobile terminal transmits the point information to the server (Step 171). The server receives and stores therein the point information (Step 172).

Subsequently, the television receives a reproduction operation of a picture taken with the mobile terminal (Step 173). In accordance with the reproduction operation, the television requests the mobile terminal to transmit the picture (Step 174). The mobile terminal transmits the picture in response to the request from the television (Step 175).

Subsequently, the television adds points corresponding to the reproduction operation to the point information of the user A (Step 176) and transmits the point information to the server (Step 177). The server receives and stores therein the point information (Step 178).

After that, the server may combine the point information received from the mobile terminal and stored in the server with the point information received from the television and stored in the server. Then, the server may transmit the combined point information to the mobile terminal and the television.

Accordingly, points are added for the whole series of operations that are necessary for cooperative operations of the mobile terminal and the television. As a result, the user can grasp points associated with the series of operations.

However, information of a subtotal of the points received from the mobile terminal and information of a subtotal of the points received from the television may be transmitted separately.

In the example of FIG. 16, the point addition processing is executed in each of the mobile terminal and the television, and the point information of each of the mobile terminal and the television is transmitted to the server. However, each of the mobile terminal and the television may merely transmit the operation history information thereof to the server so that the server can execute the point addition processing.

Further, in the example of FIG. 16, the server stores the point information of the mobile terminal and the point information of the television. However, each of the mobile terminal and the television may execute the point addition processing, store the point information thereof, and directly exchange the point information thereof with each other without involving the server.

Further, in the example of FIG. 16, operations constituting the series of operations such as a setting operation, a photographing operation, and a reproduction operation are considered as check points, and points are added for the respective operations. However, points may be added for only the whole of the series of operations. In other words, in the example described above, the setting operation and the photographing operation may be merely added to the operation list when those operations are completed, and points may not be added until the reproduction operation is completed. In this case, the mobile terminal and the television exchange operation history information thereof with each other in order to determine whether the series of operations is completed.

Modified Example 2

In the embodiment described above, the example in which points are added for the photographing operation with use of a camera has been described. However, an operation for which points are given is not limited to the camera operation in the present disclosure. For example, points may be added for a user operation on a network connection setting function of an information processing apparatus. FIG. 17 is a diagram of a table showing a relationship between an operation on the settings of network connection and points to be added for the operation.

As shown in FIG. 17, operations of setting wireless LAN, setting an IP address, checking Internet connection, checking connection among a plurality of devices, completing connection of 100 or more sites, and the like are provided as operation items of the network connection setting function, and points are assigned to each of the operation items.

Modified Example 3

In the embodiment described above, the example in which points continue to be added in accordance with operations has been described. However, points may be reduced depending on an operation. For example, in the case where a user does not perform operations associated with most of functions provided by the mobile terminal for a long period of time (or the frequency at which operations are performed is below a predetermined value), or in the case where the mobile terminal itself is not used for a long period of time, the mobile terminal may reduce points.

In the case where a point value falls below a predetermined threshold value by the reduction processing described above, the mobile terminal may transmit a massage to prompt a user to use the functions or the mobile terminal itself by using a pop-up message or e-mail. In this case, a message to prompt the user to switch the user interface to a user interface of a lower difficulty level in operation or to a simplified user interface may be displayed so that the user interface may be changed by an approval of the user.

Such a change of the user interface may serve as a kind of penalty to a user, but it is also effective when a user skilled in operations transfers his/her used mobile terminal to a user being a beginner, for example.

Examples of the case where points are reduced include, in addition to the case where functions are unused for a long period of time, a case where a user performs unfavorable operations. For example, a user performs an operation that may lead to a failure or damage of the mobile terminal, and a user immoderately transmits pictures (a predetermined number of pictures or more within a certain period of time) to another user.

In the case where points are not increased because a certain function is not used for a predetermined period of time, a message to prompt a user to use the function may be presented using a pop-up message or e-mail, for example, though points are not reduced.

Modified Example 4

In the point-information sharing processing among a plurality of users in the embodiment described above, the example in which pieces of point information of the plurality of users are stored in the server and those pieces of point information are transmitted from the server to the respective mobile terminals has been described. However, in the case where the point addition processing and the point-information storage processing can be performed in the mobile terminals, the pieces of point information may be exchanged directly among the plurality of mobile terminals without involving the server.

Modified Example 5

In the same manner, also in the setting-information and operation-history-information sharing processing among a plurality of users in the embodiment described above, search and retrieval processing of a user having a higher point, transmission processing of setting information and advice information, and the like may be performed by direct communication between mobile terminals or may be performed via a server.

Modified Example 6

In the embodiment described above, the three specific examples (first specific example, second specific example, and third specific example) on the point addition processing have been separately described with reference to FIGS. 5 to 7. However, for example, those three specific examples may be executed in order of the first specific example, the second specific example, and the third specific example in a step-by-step manner to continuously add the points. For example, the whole series of operations in the first specific example may be considered to be one of a plurality of check points in a series of operations (device setting operation) in the second specific example. In this case, points may first be added for the first specific example, thereafter pointes may be further added for the second specific example when an operation similar to the series of operations in the first specific example (check point) is performed a plurality of times, and points may be further added for the third specific example in accordance with a frequency of the series of operations performed in the second specific example with respect to the operation history.

Modified Example 7

In the embodiment described above, general standards on the difficulty level in operation (for example, as to whether a user can use night view mode during the night and whether a user can make a manual setting) have been exemplified as operation items (types of operations) that are targets for which points are added. However, in addition to the general standards, operation items into which a gamification element is incorporated may be set as targets for which points are added.

For example, in the case where the mobile terminal 100 stores operation history information of other users through the setting-information and operation-history-information sharing processing described above, higher points may be given to a user who performs an operation of higher level than that of the other users or an effort-demanding operation. In this case, the mobile terminal compares the detected operation of the user and the operation histories of the other users to determine the difficulty level by using the table described above or the like. For example, in the case where the fact that the user B performs a photographing operation in normal mode during the night is found out based on the operation history of the user B and if the user A similarly performs an photographing operation in night view mode during the night, higher points may be given to the user A. Furthermore, higher points may be given to the user A if the number of pictures taken by the user A in a day is larger than that of the user B.

Modified Example 8

In the embodiment described above, the point addition processing in the mobile terminal including a camera has been described. However, as described above, the present disclosure is applicable to processing associated with any operation other than the operations for a camera. In this case, an information processing apparatus to which the present disclosure is applicable is assumed to be any devices that can be operated by a user, such as a desktop PC, a notebook PC, a camcorder, a television apparatus, a PVR (Personal Video Recorder), a game device, a projector, a car navigation system, a digital photo frame, an HDD (Hard Disk Drive) device, a health-care device, and a home appliance.

Modified Example 9

In the embodiment described above, the example in which the mobile terminal 100 includes the operation history management unit 120, the device setting management unit 130, and the device operation determination unit 140 has been described. However, any or all of the functions provided by those operation history management unit, the device setting management unit, and the device operation determination unit may be provided on the cloud side (by a server in the embodiment described above or another server).

(Others)

The present disclosure may have the following configurations.

(1) An information processing apparatus, including:
   a communication unit;
   a storage configured to store rule information indicating a rule for calculating points of a user in accordance with a type of an operation by the user; and
   a controller configured
      to calculate, based on a detected operation of a first user and the rule information, points of the first user in accordance with a type of the detected operation,
      to control the storage to store first point information indicating the calculated points, and
      to control the communication unit to perform one of transmission of the stored first point information to another information processing apparatus and reception of second point information from the other information processing apparatus, the second point information indicating points of a second user and being stored in the other information processing apparatus.

(2) The information processing apparatus according to (1), in which
   the controller is configured to generate display information for displaying the stored first point information and the received second point information.

(3) The information processing apparatus according to (1) or (2), in which
   the controller is configured
      to control the storage to store operation history information indicating the detected operation, and
      to control the communication unit to perform one of transmission of the stored operation history information to the other information processing apparatus and reception of operation history information of the second user from the other information processing apparatus, the operation history information of the second user being stored in the other information processing apparatus.

(4) The information processing apparatus according to any one of (1) to (3), in which
   the controller is configured to calculate the points when a series of operations is completed.

(5) The information processing apparatus according to any one of (1) to (4), in which
   the controller is configured to calculate the points for each of operations constituting a series of operations.

(6) The information processing apparatus according to any one of (1) to (5), in which
   the controller is configured
      to control the storage to store operation history information indicating the detected operation, and
      to calculate a frequency of an operation detected after the operation history information is stored with respect to an operation stored as the operation history information, and calculate the points such that a value of the points becomes higher as the frequency becomes lower.

(7) The information processing apparatus according to any one of (1) to (6), further including a display configured to display a first user interface for receiving the operation, in which
   the controller is configured to control the display to change the first user interface to a second user interface in a case where a point value indicated by the stored first point information exceeds a predetermined threshold value, the second user interface being handled by an operation of a level higher than that for the first user interface.

(8) The information processing apparatus according to any one of (1) to (7), in which the storage is configured to store a first application that provides a first user interface for receiving the operation, and the controller is configured to control the storage to update the first application to be a second application in a case where a point value indicated by the stored first point information exceeds a predetermined threshold value, the second application providing a second user interface handled by an operation of a level higher than that for the first user interface.

(9) The information processing apparatus according to any one of (1) to (8), in which the controller is configured to control the communication unit to perform one of transmission of the first point information to another apparatus capable of operating in cooperation with the information processing apparatus and reception of third point information from the other apparatus, the third point information indicating the points of the first user and being stored in the other apparatus, and to combine the first point information and the second point information.

The present disclosure contains subject matter related to that disclosed in Japanese Priority Patent Application JP 2012-075031 filed in the Japan Patent Office on Mar. 28, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a display;
   a communication unit;
   a storage configured to store rule information in which each of a plurality of operations of a user for a device of the information processing apparatus are assigned a point value in accordance with a type of operation; and
   a controller configured:
      to calculate, based on a detected operation of a first user of the device of the information processing apparatus and the rule information, point values of the first user in accordance with the type of the detected operation, wherein the detected operation is detected from among the plurality of operations;
      to control the storage to store first point information indicating the calculated point values;
      to control the display to change from a first user interface to a second user interface based on the stored first point information, wherein a set of buttons displayed in the second user interface is different from, and has corresponding different function from, a set of buttons displayed in the first user interface; and
      to control the communication unit to one of transmit the stored first point information to another information processing apparatus or receive second point information from the other information processing apparatus, the second point information indicating point values of a second user and being stored in the other information processing apparatus,
   wherein each set of buttons on the first and second user interface control operations being performed by the device of the information processing apparatus.

2. The information processing apparatus according to claim 1, wherein
   the controller is configured to generate display information for displaying the stored first point information and the received second point information.

3. The information processing apparatus according to claim 1, wherein
   the controller is configured:
      to control the storage to store operation history information indicating the detected operation; and
      to control the communication unit to one of transmit the stored operation history information to the other information processing apparatus or receive operation history information of the second user from the other information processing apparatus, the operation history information of the second user being stored in the other information processing apparatus.

4. The information processing apparatus according to claim 1, wherein
   the controller is configured to calculate the point values in an event of a series of operations is completed.

5. The information processing apparatus according to claim 1, wherein the controller is configured to calculate the point values for each of operations constituting a series of operations.

6. The information processing apparatus according to claim 1, wherein
   the controller is configured:
      to control the storage to store operation history information indicating the detected operation; and
      to calculate a frequency of an operation detected after the operation history information is stored with respect to an operation stored as the operation history information, and calculate the point values such that a value of the point values becomes higher as the frequency becomes lower.

7. The information processing apparatus according to claim 1,
   wherein the display is configured to display the first user interface for receiving the detected operation, and
   wherein the controller is configured to control the display to change the first user interface to the second user interface in a case where the point values indicated by the stored first point information exceeds a predetermined threshold value, the second user interface being handled by an operation of a level higher than that for the first user interface.

8. The information processing apparatus according to claim 1, wherein
   the storage is configured to store a first application that provides the first user interface for receiving the detected operation, and
   the controller is configured to control the storage to update the first application to be a second application in a case where the point values indicated by the stored first point information exceeds a predetermined threshold value, the second application providing the second user interface handled by an operation of a level higher than that for the first user interface.

9. The information processing apparatus according to claim 1, wherein
   the controller is configured:
      to control the communication unit to one of transmit the first point information to another apparatus capable of operating in cooperation with the information processing apparatus or receive third point information from the other apparatus, the third point information indicating the point values of the first user and being stored in the other apparatus, and to combine the first point information and the second point information.

10. An information processing method, comprising:

in an information processing apparatus:

storing rule information in which each of a plurality of operations of a user for a device of the information processing apparatus are assigned a point value in accordance with a type of operation;

acquiring a detected operation of a first user of the device of the information processing apparatus, wherein the detected operation is detected from among the plurality of operations;

calculating point values of the first user in accordance with the type of the detected operation based on the rule information;

storing first point information indicating the calculated point values;

controlling a display to change from a first user interface to a second user interface based on the stored first point information, wherein a set of buttons displayed in the second user interface is different from, and has corresponding different functions from, a set of buttons displayed in the first user interface; and one of transmitting the stored first point information to another information processing apparatus or receiving second point information from the other information processing apparatus, the second point information indicating point values of a second user and being stored in the other information processing apparatus, wherein each set of buttons on the first and second user interface control operations being performed by the device of the information processing apparatus.

11. A non-transitory computer-readable storage medium having stored thereon, a set of computer-executable instructions for causing a computer to perform steps in an information processing apparatus, comprising:

storing rule information in which each of a plurality of operations of a user for a device of the information processing apparatus are assigned a point value in accordance with a type of operation;

acquiring a detected operation of a first user of the device of the information processing apparatus, wherein the detected operation is detected from among the plurality of operations;

calculating point values of the first user in accordance with the type of the detected operation based on the rule information;

storing first point information indicating the calculated point values;

controlling a display to change from a first user interface to a second user interface based on the stored first point information, wherein a set of buttons displayed in the second user interface is different from, and has corresponding different function from, a set of buttons displayed in the first user interface; and one of transmitting the stored first point information to another information processing apparatus or receiving second point information from the other information processing apparatus, the second point information indicating point values of a second user and being stored in the other information processing apparatus, wherein each set of buttons on the first and second user interface control operations being performed by the device of the information processing apparatus.

12. An information processing apparatus, comprising:

a communication unit configured to communicate with a server; and a controller configured:

to detect an operation of a first user of the device of the information processing apparatus;

to control the communication unit to transmit information on the detected operation of the first user, to the server, wherein the detected operation is detected from among a plurality of operations of a user, and to one of transmit first point information of the first user to another information processing apparatus by using the server, wherein the first point information of the first user corresponds to a type of the detected operation and is calculated by the server based on the detected operation of the first user and rule information, wherein in the rule information each of the plurality of operations are assigned a point value in accordance with a type of operation, and receive second point information from the server, the second point information indicating point values of a second user who operates the other information processing apparatus, and to control a display to change from a first user interface to a second user interface based on the first point information, wherein a set of buttons displayed in the second user interface is different from, and has corresponding different function from, a set of buttons displayed in the first user interface, wherein each set of buttons on the first and second user interface control operations being performed by the device of the information processing apparatus.

* * * * *